United States Patent [19]

Izumi et al.

[11] 4,173,055

[45] Nov. 6, 1979

[54] WINDSHIELD WASHER PUMP DRIVE MECHANISM

[75] Inventors: John Izumi, Glen Ellyn; Angelo D'Orio, Elmwood Park, both of Ill.

[73] Assignee: Auto Components, Inc., Franklin Park, Ill.

[21] Appl. No.: 960,447

[22] Filed: Nov. 13, 1978

[51] Int. Cl.² ............................................... B60S 1/46
[52] U.S. Cl. ............................. 15/250.02; 15/250.17; 417/319
[58] Field of Search ........... 15/250.02, 250.16, 250.17; 417/319

[56] References Cited

U.S. PATENT DOCUMENTS

| | | | |
|---|---|---|---|
| 2,905,962 | 9/1959 | Ziegler | 15/250.02 |
| 2,925,618 | 2/1960 | Ziegler | 15/250.02 |
| 2,959,803 | 11/1960 | Ziegler | 15/250.02 |
| 3,257,951 | 6/1966 | Espenschied et al. | 15/250.02 X |
| 3,503,091 | 3/1970 | Petry et al. | 15/250.02 |
| 3,574,882 | 4/1971 | Petry | 15/250.02 |

*Primary Examiner*—Peter Feldman
*Attorney, Agent, or Firm*—James & Franklin

[57] ABSTRACT

The pump drive mechanism is driven by a wiper drive motor having a drive pin adapted to revolve in a circular path, while driving the wipers, and which is displaced along a generally radially directed path outwardly of the circular path, at a prescribed point thereon, when the wipers are moved to the park position. The mechanism has a rotatable drive cam, which is connected, via a cam follower, to reciprocate the piston rod of the pump. To facilitate installation, the drive cam carries a drive pin engaging portion designed to automatically engage the drive pin, after the first actuation of the wiper motor, regardless of the initial relative positions of the drive pin and drive cam. As a result, the necessity for positioning the drive cam with respect to the drive pin in a prescribed position during installation is eliminated. A second aspect of the invention relates to the pump action termination portion of the mechanism which includes an indexable rachet wheel having evenly spaced, uniformly shaped teeth, provided to count a given number of strokes. After the given number of strokes, a substantially wedge shaped cam, carried on the rachet wheel, is moved into position as the wheel is indexed, to engage a lip on the reciprocating piston rod to prevent further pump actuation. The structure of the cam and lateral movement of the piston rod permit same to cooperate in a manner which facilitates positioning of the lip relative to the cam, thereby eliminating the necessity for the presence of a flexible tooth on the rachet wheel, heretofore required to permit sufficient "yield" in the mechanism to prevent binding of the cam and lip.

36 Claims, 21 Drawing Figures

WINDSHIELD WASHER PUMP DRIVE MECHANISM

The present invention relates to a windshield pump drive mechanism designed for use in conjunction with a windshield wiper drive motor and, more particularly, to a windshield washer pump drive mechanism wherein the necessity for positioning the parts thereof in a prescribed manner during installation is eliminated and, wherein the mechanism for terminating the pumping action has been simplified to reduce manufacturing costs and enhance the reliability of the operation of the mechanism.

Many automotive vehicles are provided with a windshield washer pump which provides one or more squirts of liquid to the windshield for cleaning purposes. Normally, the vehicle operator will actuate the windshield wipers at the time, or shortly after, the windshield washer pump is actuated in order to remove the cleansing liquid which has been deposited on the windshield. It is, therefore, advantageous to utilize the same motor which drives the windshield wipers to drive the windshield washer pump, thereby eliminating the necessity for separate motors and considerably reducing the cost of the system.

When the windshield wiper drive motor is actuated, the wipers are moved from a park position, at the very bottom of or below the windshield, to a running position in which the wipers are moved to and fro in arcuate paths across the windshield. The windshield wiper drive motor is provided with a drive pin. The drive pin revolves in a circular path of given radius as the wipers are moved through the running position. However, when the motor is deactuated in order to move the windshield wipers into the park position, the pin first moves to a prescribed point along the circular path and from the prescribed point outwardly along a generally radially directed path to its park position. When the drive motor is again actuated, the pin is moved inwardly along the generally radially directed path to the prescrived point on the circular path, as the wipers are moved from their park position to their running position and then along the circular path as the wipers are moved through the running position. Thus, in order for the movement of the wiper motor drive pin to be utilized to drive the washer pump, both the circular movement and generally radially directed movement of the drive pin must be accommodated.

It is desirable to incorporate a feature into the pump drive mechanism which will automatically terminate the pumping action after a predetermined number of strokes. Thus, if the windshield wipers continue to run for an extended length of time after the pump mechanism is actuated, the pump drive mechanism itself will terminate the pumping action after a given number of squirts.

Due to the separate movements of the drive pin in different directions, and because of the desirability of the incorporation of the pump termination feature, the drive pin cannot be directly connected to the reciprocating piston rod which drives the pump. Therefore, a windshield washer pump drive mechanism is interposed between the drive pin of the windshield wiper motor and the reciprocating rod of the pump in order to accommodate the circular movement of the drive pin as the wipers are moved through the running position and the generally radially directed movements of the pin toward and away from the circular path as the wipers are moved from and to their park position, as well as to terminate the pumping action after the prescribed number of squirts.

In general, the windshield washer pump drive mechanism comprises a rotating multi-lobe drive cam. The cam engages the drive pin and is rotated as the drive pin revolves in its circular path. A pivotally mounted cam follower is connected to the piston rod of the pump and reciprocates same as it follows the contours of the revolving cam.

The drive cam is provided with a portion thereof designed to engage the drive pin such that the cam is rotated as the pin moves through its circular path. The pin engaging portion of the drive cam must, however, also accommodate the generally radially directed movements of the drive pin and still maintain the connection between the drive pin and the drive cam. This function has been achieved by designing the pin engaging portion of the cam to be a section which extends from the surface of the cam towards the pin and which has a generally radially directed slot therein. The slot receives and retains the drive pin, and rotates the cam as the pin revolves along its circular path. The slot also permits the pin to move along its generally radially directed path from the prescribed point on the circular path and back thereto as the wipers are moved to and from their park position, without disengaging the pin.

This design, however, creates considerable difficulties during installation of the windshield washer pump drive mechanism. Unless the pin is received in the slot during installation, the structure of the pin engaging portion will prevent the pin from subsequently entering the slot, causing the mechanism to operate improperly. Thus, during installation, it is critical that the drive cam and, particularly, the drive pin engaging portion carried thereon, be properly oriented with respect to the position of the drive pin so as to receive same.

In practice, however, this is difficult to achieve for two reasons. The first reason relates to the fact that the drive pin can be located at any position along its circular path if the wipers are in the running position and the car motor was shut off before the windshield wiper drive motor was deactuated. However, when the drive pin is in the running position, the drive cam is firmly maintained in one of a limited number of rotational positions by the action of the cam follower, which is held in one of the recesses along the periphery thereof. Thus, it is very difficult to rotate the drive cam to properly position the pin engaging portion thereof with respect to the drive pin. Second, the positions of the drive cam and drive pin are hidden by the windshield washer pump drive mechanism housing during installation. Thus, the installer cannot visually line up the drive cam with the drive pin to assure that the drive pin is received within the slot.

To make this situation worse, many windshield wiper pump drive mechanisms are provided with a fast response feature wherein a squirt is provided as the wipers move from the park position to the running position and, thus, prior to the movement of the windshield wipers within the arcuate wiping area. This is accomplished by mounting the drive pin engaging portion on the drive cam at a location which causes the cam follower to be near the crest of a protrusion on the drive cam periphery (instead of in a recess) when the drive pin is in the park position. By re-designing the slot in the drive pin engaging portion to be substantially "C"- shaped, the drive pin, as it is moved from the park position to the running position, causes the drive cam to first rotate a small distance in a direction opposite to its normal direction of rotation, to permit the cam follower to move into a recess, causing the piston rod to move through its discharge stroke, and thereby provide a squirt. Thereafter, as the drive pin is driven in its circular path, the drive cam rotates in the opposite direction to provide the normal pumping action.

With this design, installation is even more complicated because the cam follower, located near the crest of a protrusion along the periphery of the drive cam, tends to rotate the cam until the cam follower rests in a recess, because of the spring loading of the cam follower. Thus, during installation, the installer must properly align the pin engaging portion of the drive cam with the drive pin and, at the same time, maintain the rotational position of the drive cam in an unstable condition. This situation is further complicated by the fact that the installer cannot see the position of the drive cam or the drive pin because of the windshield washer pump drive mechanism housing.

Thus, installation of a windshield washer pump drive mechanism, particularly those having a fast response feature, has been a difficult and time consuming operation. The installer must insert a pin through an opening in the windshield washer pump drive mechanism housing in order to immobilize the cam in the required unstable condition and thereafter align the drive pin with the pin engaging portion of the cam. Once this is accomplished, the windshield washer pump drive mechanism housing is affixed to the windshield wiper drive motor housing and thereafter the pin holding the drive cam is removed. If the installer has performed this intricate operation skillfully, proper functioning of the windshield washer pump drive mechanism will be achieved. If not, the entire assembly must be dismantled and the installation operation repeated.

As can be readily appreciated, installation of the windshield washer pump drive mechanism at the factory normally does not create a difficult problem because the installers are skilled at performing this operation. However, when a windshield washer pump drive mechanism has to be replaced in the field, by a garage mechanic or a "do-it-yourself" car owner, substantial problems are created because of the lack of experience and skill of the installer. Because of this, the cost of replacing the windshield washer pump drive mechanism is considerably increased due to the amount of time required for installation.

The pump termination device normally incorporated in mechanisms of this type, because of its tendency to jam, also causes serious problems. This device normally comprises a pawl, connected to the cam follower, which advances a counter in the form of a rachet wheel each time the pump rod is reciprocated. Carried by the rachet wheel is a piston rod engaging cam which, when the rachet wheel is in the appropriate rotational position, interferes with the reciprocation of the piston rod in order to terminate the pumping action. The rod engaging cam interferes with the reciprocation of the pump rod by engaging a lip which extends from the rod in a direction normal to the movement thereof. The cam is wedge shaped and has a side portion which, in one rotational position of the rachet wheel, is oriented in a direction generally parallel to the direction of reciprocation of the rod, such that the lip moves along the side portion, immediately prior to the time when the lip engaging surface of the cam engages the lip. Since the wheel, and thus the cam, is rotating, it is necessary that the lip clear the side of the cam as the lip engaging portion of the cam is moved in position to engage the lip. Because of the design of the parts, it has been heretofore necessary to incorporate a flexible tooth on the periphery of the rachet wheel at the point therealong engaged by the pawl in the rotational position of the wheel immediately before the lip is engaged by the cam. This flexible tooth provides the mechanism with sufficient "yield" to permit the lip to clear the corner of the cam, and thus move from the side portion of the cam to the lip engaging portion thereof, without jamming.

Normally, the flexible tooth is a torsion spring. The spring is mounted in a recess within the wheel, and the end thereof extends through an opening in the wall of the wheel. The spring end protrudes from the periphery of the wheel, such that it is engaged by the pawl, as a tooth would be, when the wheel is advanced to place the cam in position to engage the lip on the reciprocating rod. This prevents jamming of the lip with the side of the cam by permitting a certain amount of mechanical "yield" in the linkage.

However, the use of such a flexible tooth complicates the mechanism substantially and requires additional manufacturing operations. Therefore, in order to reduce the complexity and, thus, the cost of the mechanism and enhance its reliability of operation, it is advantageous to eliminate the flexible tooth.

It is, therefore, a prime object of the present invention to provide a windshield washer pump drive mechanism which is designed to be installed on a wiper motor, without the necessity for the prior positioning of the parts thereof relative to the parts of the motor.

It is a second object of the present invention to provide a windshield washer pump drive mechanism having self-aligning drive pin engaging means.

It is a third object of the present invention to provide a windshield washer pump drive mechanism wherein one portion of the drive pin engaging means is engaged by the drive pin during the first actuation of the wiper motor and a second portion of the drive pin engaging means automatically aligns with and engages the drive pin during all subsequent actuations of the wiper motor.

It is a fourth object of the present invention to provide a windshield washer pump drive mechanism wherein the self-aligning drive pin engaging portion has an exterior edge adapted to intersect the circular path of the drive pin.

It is a fifth object of the present invention to provide a windshield washer pump drive mechanism having self-aligning drive pin engaging portion comprising a slot with a leading interior edge which intersects the circular path of the drive pin and extends outwardly to engage the drive pin when same is in the park position.

It is a sixth object of the present invention to provide a windshield washer pump drive mechanism wherein the pin engaging portion of the drive cam is automatically positioned with respect to the park position of the drive pin, after the initial actuation of the wiper motor, such that same engages the drive pin.

It is another object of the present invention to provide a windshield washer pump drive mechanism having a pump termination linkage of simplified design.

It is still another object of the present invention to provide a windshield washer pump drive mechanism wherein the pump termination portion comprises a counter in the form of a rachet wheel having evenly spaced, uniformly shaped, teeth.

It is a further object of the present invention to provide a windshield washer pump drive mechanism wherein the pump termination portion comprises a wedge shaped cam and a laterally movable piston rod designed to cooperate to prevent jamming prior to engagement of the lip engaging surface of the cam with the rod.

It is still a further object of the present invention to provide a windshield washer pump drive mechanism of simplified construction, resulting in reduced manufacturing costs and increased reliability of function.

In accordance with the present invention, a windshield washer pump drive mechanism is provided for use in conjunction with a windshield wiper drive motor having a drive pin adapted to revolve in a circular path when the motor is actuated to drive the wipers and which is movable, from a prescribed point on the circular path, along a generally radially directed path, outwardly of the circular path to a park position, as the wipers are moved to the park position. The mechanism comprises a pump driven by a piston rod which is reciprocatable between intake and discharge positions. Rotatable cam means are provided having a plurality of alternating protrusions and recesses along the periphery thereof. Means, in operable engagement with the cam, are movable, in accordance with the rotation of the cam, to reciprocate the rod.

The drive cam comprises drive pin engaging means. The drive pin engaging means includes first means for engaging the drive pin as the drive pin moves through its circular path only during the initial actuation of the motor after installation, and second means which, after the drive pin has been disengaged from the first means by the first movement of the pin along its generally radially directed path, outwardly of its circular path, to the park position, engages the pin all times thereafter. Means are provided for positioning the cam to bring the second means into engagement with the pin subsequent to the first movement of the pin to its park position.

In this manner, the necessity for orienting the drive cam and the drive pin in a particular relative position with respect to each other during installation of the windshield washer pump drive mechanism is eliminated. Once the motor is actuated, the pin will move along its circular path until it engages the first means on the pin engaging means. This will cause the drive cam to rotate, thereby operating the pump, until the wiper motor is deactuated. At that time, the drive pin will move to a prescribed position along the circular path and thereafter move along a generally radially directed path, outwardly of the circular path, to the park position. The cam positioning means comprises a cam follower which is biased against the periphery of the cam. Due to the biasing of the cam follower against the periphery of the drive cam, as soon as the drive pin disengages the first means on the pin engaging means by moving to the park position, the cam is free to rotate and the cam follower will rotate the drive cam until the cam follower rests in the nearest recess. In doing so, the position of the drive cam will automatically be adjusted such that the second means on the pin engaging means aligns with the drive pin, now in the park position. Thereafter, the drive pin will remain in engagement with the second means as it moves between the running and park positions, and the correct operation of the mechanism is assured.

The pin engaging means comprises a boss, protruding from the surface of the drive cam, having generally radially extending slot therein. The first means comprises the exterior edge of the boss. The exterior edge of the boss is designed to intersect the circular path of the drive pin, such that exterior edge of the boss will engage the drive pin as the pin moves along its circular path.

However, the exterior edge of the boss extends outwardly from the circular path a distance less than the distance to the park position of the drive pin. Thus, when the drive pin is placed in the park position, after the first actuation of the wiper motor after installation, the pin will be disengaged from the exterior side of the boss.

The second means comprises the leading interior edge of the slot. The leading interior edge of the slot has a first portion which also intersects the circular path of the drive pin. However, the leading interior edge of the slot, unlike the exterior edge of the boss, has a second portion which extends radially outwardly to the park position of the drive pin.

Therefore, when the wiper motor is deactuated after the first actuation thereof after installation, the exterior edge of the boss will be disengaged from the pin by the movement of the pin to the park position. The cam follower bearing against the drive cam periphery will cause the drive cam to rotate slightly until it rests in a recess on the cam periphery, such that the leading interior edge of the slot engages the drive pin. Thereafter, the drive pin will continuously engage leading interior edge of the slot, regardless of whether the pin is in its running or park position.

A second aspect of the invention relates to the means for counting the pump strokes and for terminating the pumping action after a given number of strokes. This means comprises a counter in the form of a rachet wheel having a plurality of evenly spaced, uniformly shaped teeth on the periphery thereof. A pawl is connected to a pin extending from the cam follower means for movement therewith. The pawl engages the rachet wheel to advance the wheel once for each pump stroke. Means are provided, on the rachet wheel, for engaging the rod to prevent movement thereof when the wheel is advanced to a given position, indicating the desired number of strokes.

The piston rod is provided with a slot elongated in the direction of reciprocation thereof. The slot is provided with a laterally extending lobe-shaped opening on one side thereof. The pin connected to the cam follower extends through the piston rod slot to permit mounting of the pawl thereon. The pin normally engages the rear edge of the piston rod slot due to the biasing of the rod towards its discharge position. The movement of the pin drives the pawl and causes the piston rod to reciprocate, except when the rod is engaged by the rod movement preventing means. When rod movement is prevented, the rod is held in the intake position (withdrawn from the pump housing to the maximum extent). In this position, the slot and pin form a "lost motion" connection and the slot permits the pin, and thus the cam follower, to move without interference from the piston rod.

The neck of the piston rod, which extends into the pump housing, is sufficiently narrow with respect to the opening in the pump housing to permit limited lateral movement of the piston rod relative thereto. The laterally extending lobe opening of the piston rod slot permits limited lateral movement of the piston rod relative to the pin connected to the cam follower. Thus, the structure of the piston rod, and particularly the slot and neck thereof, permits the rod to move laterally relative to its normal reciprocating path.

The rod has a protruding lip thereon. The rod engaging means comprises a generally wedge shaped cam with a side surface and a lip engaging surface. The side surface extends generally radially from the shaft upon which the rachet wheel rotates towards the periphery of the wheel. The corner of the cam, located between the side surface and the lip engaging surface thereof, has been designed such that the structure thereof, in conjunction with the limited lateral movement of the piston rod, prevents jamming of the mechanism as the lip engaging surface is moved into position to engage the lip.

The cam is provided with an intermediate surface situated between the side surface and the lip engaging surface. When the piston rod is moved laterally to permit "yielding" of the mechanism, the intermediate surface facilitates movement of the lip from a position adjacent the side surface to a position adjacent the lip engaging surface, as the rachet wheel is rotated. Thus, jamming of the lip against the side surface of the cam is eliminated.

In this manner, a separate yieldable mechanism in the form of a flexible tooth on the rachet wheel is no longer required. As a result, the complexity of the mechanism is reduced, thereby reducing manufacturing costs. Further, the reliability of operation of the mechanism is substantially increased.

To these and other objects which may hereinafter appear, the present invention relates to a windshield washer pump drive mechanism, as described in the present specification and set forth in the annexed claims, taken together with the accompanying drawings, wherein like numerals refer to like parts, and in which:

Figure 1:
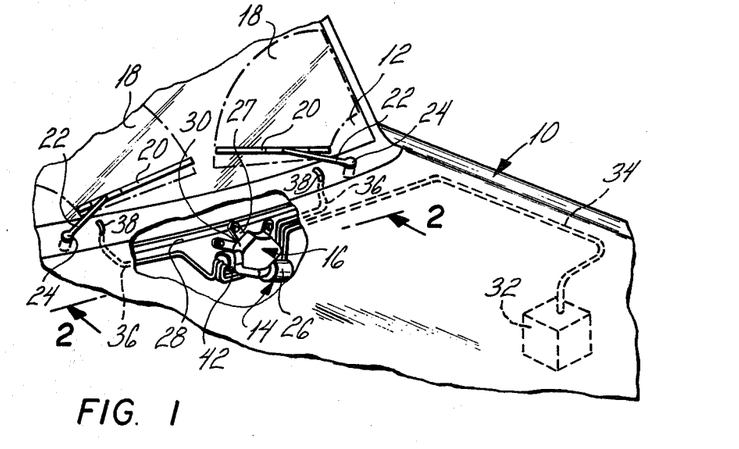
FIG. 1 is a partially cut-away environmental view showing the location of the windshield washer pump drive mechanism of the present invention within an automotive vehicle.

FIG. 1 is an environmental view showing the location, within a vehicle 10, of a cleaning apparatus for windshield 12. The windshield cleaning apparatus broadly comprises a wiper unit 14 and a windshield washer pump mechanism 16 which is designed to operate in timed relationship with the wiper unit and to be driven thereby. The windshield washer pump drive mechanism is designed to provide a series of squirts to a windshield 12 within arcuate areas 18 thereon.

The wiper unit 14 comprises a pair of wiper blades 20, each of which is adopted to be swept in an arcuate path across a different one of the areas 18 on the windshield 12. Areas 18 of windshield 12 are each defined by dot and dash lines which outline normal running areas on the windshield through which each of the blades 20, respectively, sweep. The wiper blades 20 are carried by oscillatable wiper arms 22 drivingly connected to oscillatable drive pivots 24 mounted on vehicle 10 at spaced locations adjacent the lower edge of windshield 12.

The drive pivots 24 are connected to and oscillated by a drive mechanism which includes an electric wiper motor 26 which is connected, by means of a gear reduction unit, to a uni-directional output shaft having a crank arm 27 mounted thereto. Crank arm 27 is drivingly connected with the oscillatable drive pivots 24 through a linkage arrangement 28. When the output shaft is rotated, the crank arm 27 drives linkage arrangement 28 to cause drive pivots 24 to oscillate. The oscillation of pivots 24 causes wiper arms 22 to be oscillated and, thus, the wiper blades 20 to be moved along their respective arcuate paths. The wiper drive mechanism and linkages form no part of the present invention and are not described in detail herein as the structure of same is well known in the art.

The washer unit 16 is designed to be driven by the wiper drive unit 14 and comprises a pump and a windshield washer pump drive mechanism for driving the pump to intermittently provide squirts of cleaning fluid to the windshield. The pump and the windshield washer pump drive mechanism are mounted to a support frame or housing 30 which, in turn, is secured to the housing 31 of the wiper drive mechanism.

A cleaning fluid reservoir 32, located under the hood of vehicle 10, is connected by means of conduit 34 to the windshield washer pump drive mechanism in order to supply cleaning fluid to the pump. A pair of conduits 36 are provided to carry the squirts of liquid from the pump to nozzles 38 located on the vehicle 10 below portions 18 of the windshield 12, which project the squirts onto the windshield.

The washer pump 40 comprises a plastic pump housing 42, which is secured to support frame 30 and a reciprocably movable piston member 46 slideably received within housing 42. Piston 46 is operably connected to a piston rod 48 which extends outwardly through an opening 43 in the rear end of housing 42 for connection with the remainder of the windshield washer pump mechanism.

Pump 40 also includes a valve chamber 50 secured to housing 42 at its forward end, remote from piston rod 48. Between valve chamber 50 and piston 46, within housing 42, is defined a chamber 52. The valve chamber 50 contains an inlet check valve 54 for controlling communication between chamber 52 and an input nipple 56, operably connected to conduit 34, which in turn is connected to resevoir 32 to supply cleaning fluid to the pump. Also included within valve chamber 50 are a pair of output check valves 58 for controlling communication between chamber 52 and a pair of outlet nipples 60 which are connected to conduits 36 which, in turn, are connected to nozzles 38.

Piston 46 is adopted to be reciprocably moved within housing 42 through intake and discharge strokes. When the piston is moved through its intake stroke, toward the right in FIGS. 2 and 3 of the drawings, fluid is drawn from resevoir 32 via conduit 34 and inlet nipple 56, past check valve 54 into chamber 52. When piston 46 is moved through its discharge stroke, toward the left, as viewed in FIGS. 2 and 3, the cleaning fluid in chamber 52 is forced, under pressure, past check valves 58 and delivered, through outlet nipples 60 and conduits 36 to nozzles 38 adjacent the wiper blades 20. The fluid delivered to nozzles 38 is emitted in jet form and directed towards designated areas 18 on the windshield 12 located in the arcuate path of movement of the wiper blades 20.

Piston 46 is moved through its discharge stroke by a compression spring 62 located within housing 42 and encircling the neck portion 45 of piston rod 48. Spring 62 has one end in abutting engagement with the end wall of housing 42 and the other end in abutting engagement with piston 46 at the side thereof opposite to the side which defines one of the walls of chamber 52. Compression spring 62 biases piston 46 towards valve chamber 50.

Neck portion 45 of piston rod 48 is designed to be narrower than opening 43 in the rear end of pump housing 42 through which it extends. This clearance and the manner in which the end of neck portion 45 is connected to piston 46 permit rod 48 to move laterally with respect to the pump housing to a limited degree. The necessity for this lateral movement between the piston rod and pump housing is explained in detail below.

Figure 2:
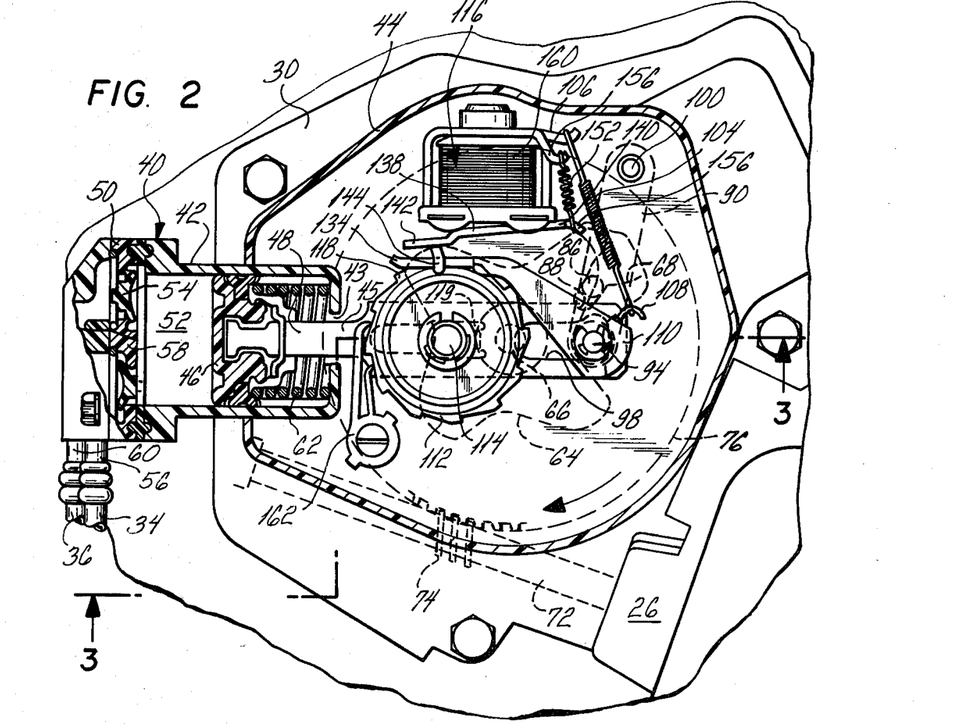
FIG. 2 is an elevated top view of the windshield washer pump drive mechanism of the present invention, showing same in the park position.
Figure 3:
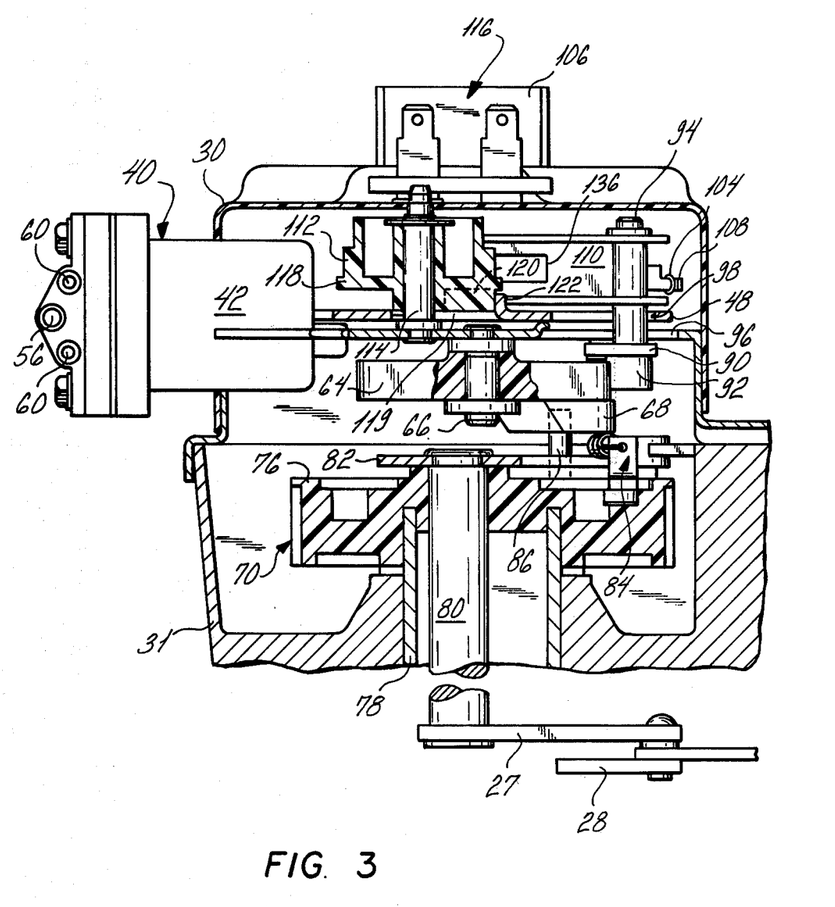
FIG. 3 is a sectional view of the windshield washer pump drive mechanism of the present invention taken along line 3—3 of FIG. 2.
Figure 4:
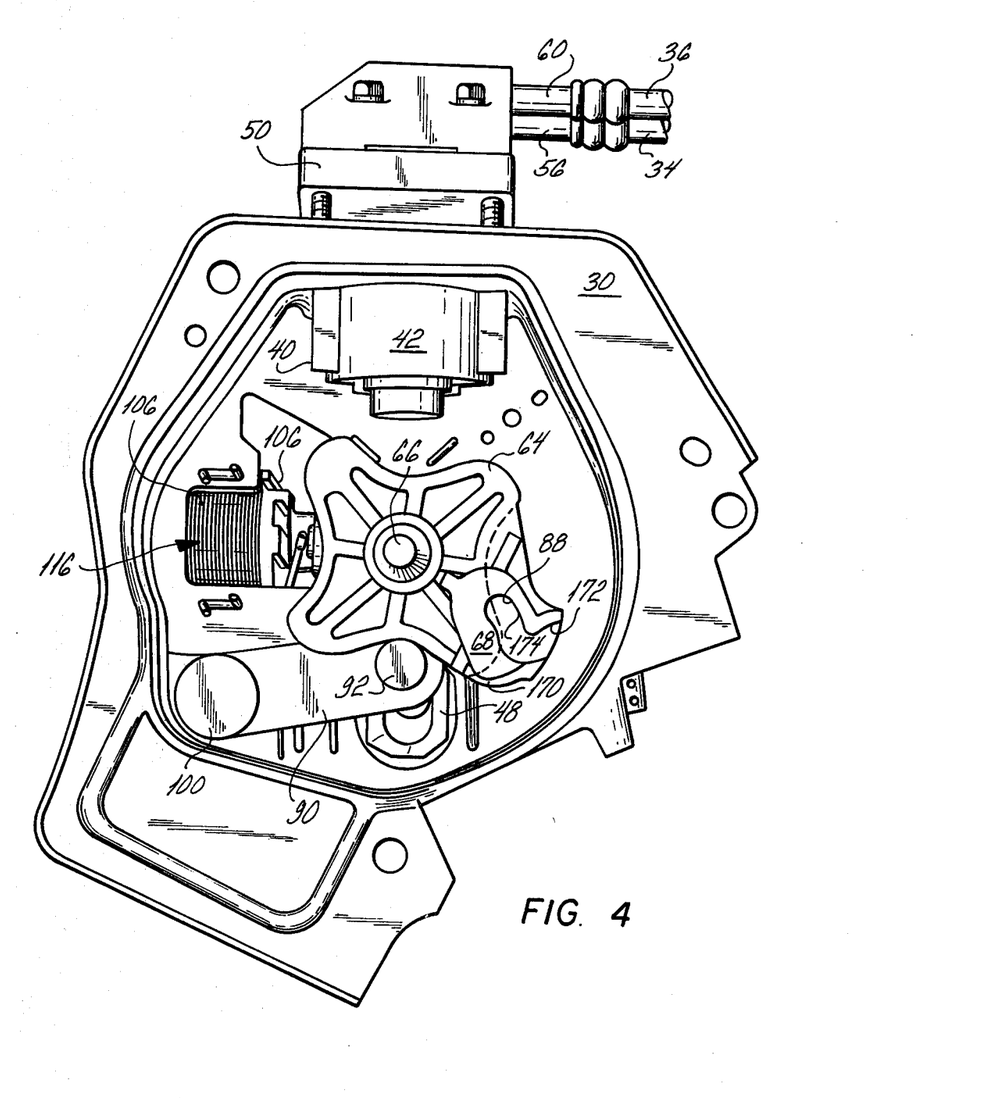
FIG. 4 is a bottom elevational view of the windshield washer pump drive mechanism of the present invention.

Piston 46 is moved through its intake stroke, in opposition to the biasing force of compression spring 62, by the movement of piston rod 48 towards the right, as seen in FIGS. 2 and 3, by the windshield washer pump drive mechanism. This mechanism comprises a multi-lobed drive cam 64, which has four evenly spaced lobes or protrusions along the periphery thereof. Between each set of adjacent protrusions is a located recess. Drive cam 64 is rotatably mounted on housing 30 on a shaft 66. Carried on the underside of drive cam 64, as seen in FIGS. 3 and 4, is a drive pin engaging part in the form of a boss 68 which extends below the surface of drive cam 64 in the direction of the wiper drive mechanism.

FIG. 3 illustrates the portion of the wiper drive mechanism which is connected to the wiper motor 26 by a motor output shaft 72 shown in FIG. 2. Output shaft 72 is connected to a gear reduction unit, generally designated 70, mounted in housing 31. Shaft 72 has mounted thereon a helical gear 74 which is meshingly interconnected with the teeth of a gear 76, fixedly mounted on a drive sleeve 78.

Eccentrically and rotatably mounted within drive sleeve 78 is a drive shaft 80 to which crank arm 27 is affixed. A suitable clutch mechanism, designated generally by reference number 84, for drivingly interconnecting and disconnecting sleeve 78 and shaft 80 is proviced to enable sleeve 78 to be rotated relative to shaft 80 and to move shaft 80 relative to sleeve 78 so as to vary the throw of the crank arm 27, and thus move wiper blades 20 between their normal running position and their park position. The crank arm 27 is drivingly connected with the oscillatable drive pivots 24 by a suitable linkage arrangement 28 to oscillate the drive pivots 24 which, in turn, causes the wiper arms 22 and blades 20 to be oscillated across portions 18 of the windshield 12 in an arcuate manner.

Since the manner in which the drive sleeve 78 and the drive shaft 80 are clutched and de-clutched, and relatively rotate to effect movement of the wiper blades 20 between their running position and their park position does not form any part of the present invention, it will not be described in detail. However, the structure of this mechanism is well known in the art.

For present purposes, it is important to understand that the drive sleeve 78 and the drive shaft 80 are de-clutched when the drive motor 26 is initially energized. This permits the drive sleeve 78 to rotate relative to the drive shaft 80, thus decreasing the throw of the crank arm 27 and moving wiper blades 22 from their park position to the running position. Sleeve 78 and shaft 80 are then automatically clutched together to oscillate the blades along the arcuate path which encompasses the running position. As the running operation is terminated, the wiper blades 20 are moved to their inboard position, the drive sleeve 78 is de-clutched from the drive shaft 80 and then rotated to a predetermined angular extent relative to the drive shaft 80 so as to increase the throw of the crank arm 27 and move the wipers from their inboard position to their depressed park position at the bottom of windshield 12. For a complete description of the structure and operation of the eccentric parking arrangement, the reader is referred to U.S. Pat. No. 3,253,206.

Energization of the drive motor causes the drive sleeve 78 to be rotated relative to the drive shaft 80 a predetermined angular extent, prior to the actuation of clutch mechanism 84 which functions to clutch the drive sleeve 78 and drive shaft 80 together to rotate as a unit. During this relative movement, the axis of shaft 80 is shifted radially relative to sleeve 78, since the drive shaft 80 is eccentrically disposed within the drive sleeve 78.

A second crank arm 82 is connected to the opposite end of shaft 80. Crank arm 82 rotates with shaft 80. The throw of crank arm 82 is decreased by the movement of shaft 80 relative to sleeve 78 in the same manner as crank arm 27, which causes a drive pin 86, fixedly connected to crank arm 82, to be moved along a generally radial, inwardly directed path relative to drive cam 64. Drive pin 86, when the wipers are driven through the arcuate path defining the running position, is moved by the rotation of shaft 80 in a circular path in order to rotate drive cam 64. However, when shaft 80 moves relative to sleeve 78, as the wipers are moved from the running position to the park position, or vice versa, drive pin 86 moves along a generally radially directed path, outwardly of the circular path between a prescribed point on the circular path and its park position. As explained in detail below, the pin engaging part comprising boss 68, carried on drive cam 64, has therein a generally radially extending slot 88 designed to receive pin 86 and to accommodate the movement thereof along the generally radially directed path between the prescribed point on the circular path and its park position.

A cam follower 90 is provided to convert the rotational motion of drive cam 64 into a reciprocal motion to reciprocate piston rod 48. The cam follower 90 includes a cam follower roller 92, which rolls in peripheral engagement with the drive cam 64, and which is rotatably journaled on the lower end of a shaft or pin 94. Pin 94 projects upwardly through aligned, elongated slots 96, 98 in the frame and piston rod 48, respectively. As explained in detail below, elongated slot 98 in piston rod 48 is provided with a laterally extending lobe shaped opening 99 to permit limited lateral movement of rod 48 relative to pin 94. Cam follower 90 is pivotally mounted, at the end thereof opposite the end to which roller 92 is mounted, to a pivot pin 100 situated in frame 30.

The cam follower roller 92 is biased into peripheral engagement with drive cam 64 by a tension spring 104, having one end connected with an armature frame 106, secured to frame 30 and the other end connected with an ear 108 on a drive pawl 110, which is pivotally mounted to the upper portion of pin 94. The armature frame 106 and pawl 110 comprise a part of the control mechanism, as will be described below.

The rotation of drive cam 64 causes cam follower roller 92 to move in an arcuate path about pin 100, thereby causing piston rod 48 to be reciprocated between an intake position and a discharge position to provide the necessary pumping action. A control mechanism is provided to establish a driving connection between piston rod 48 and the rotating drive cam 64 for predetermined number of wiper strokes, and during which the piston rod 48 is fully reciprocated through its intake and discharge strokes for each of the predetermined number of wiper strokes, and then to automatically, abruptly interrupt the driving connection therebetween, after the predetermined number of wiper strokes have been completed.

This mechanism, in general, includes a wiper stroke counting means in the form of an indexable rachet wheel 112, which is rotatably mounted on a shaft 114, journaled into a portion of frame 30. Rachet wheel 112 has an interruptible drive connection with the drive pawl 110, pivotally connected to pin 94 of the cam follower 90. Means are provided, generally designated 116, which are operable, when momentarily energized by the operator, to establish a drive connection between the rachet wheel 112 and the drive pawl 110, and which cooperate with the rachet wheel to automatically disconnect the drive connection therebetween upon the rotation of the rachet wheel one complete revolution.

Rachet wheel 112 has, along the periphery thereof, a plurality of evenly spaced, uniformly shaped, teeth 118, preferably twelve in number, which, in cooperation with the end of pawl 110, cause the rachet wheel 112 to be indexed one-twelfth of a revolution for each movement of pawl 110 caused by the arcuate movement of cam follower 90 along the periphery of drive cam 64. It should be noted that piston rod 48 is provided with an opening 119 therein, through which pin 114, to which rachet wheel 112 is rotatably mounted, extends. In this manner, piston rod 48 is free to reciprocate without interference from pin 114. Opening 119 is sufficiently wide to permit limited lateral movement of rod 48 relative to pin 114.

The rachet wheel 112 is normally disconnected from the drive pawl 110 and disposed in a stop position in which it interrupts the driving connection between the drive cam 64 and piston rod 48. When the pawl is spaced from the rachet wheel, the rachet wheel is in a rotational position such that a cam 120, affixed to the bottom thereof (see FIG. 5), engages a lip 122 protruding upwardly from piston rod 48 to hold piston rod 48 against movement from its discharge position by compression spring 62, located within pump housing 40. The provision of the slot 98 in piston rod 48 provides a lost motion connection between the pin 94 of the cam follower and the piston rod 48 to enable the pin 94 to move relative to the piston rod 48 so that the drive connection therebetween can be interrupted.

Figures 5, 6, 7, 8:
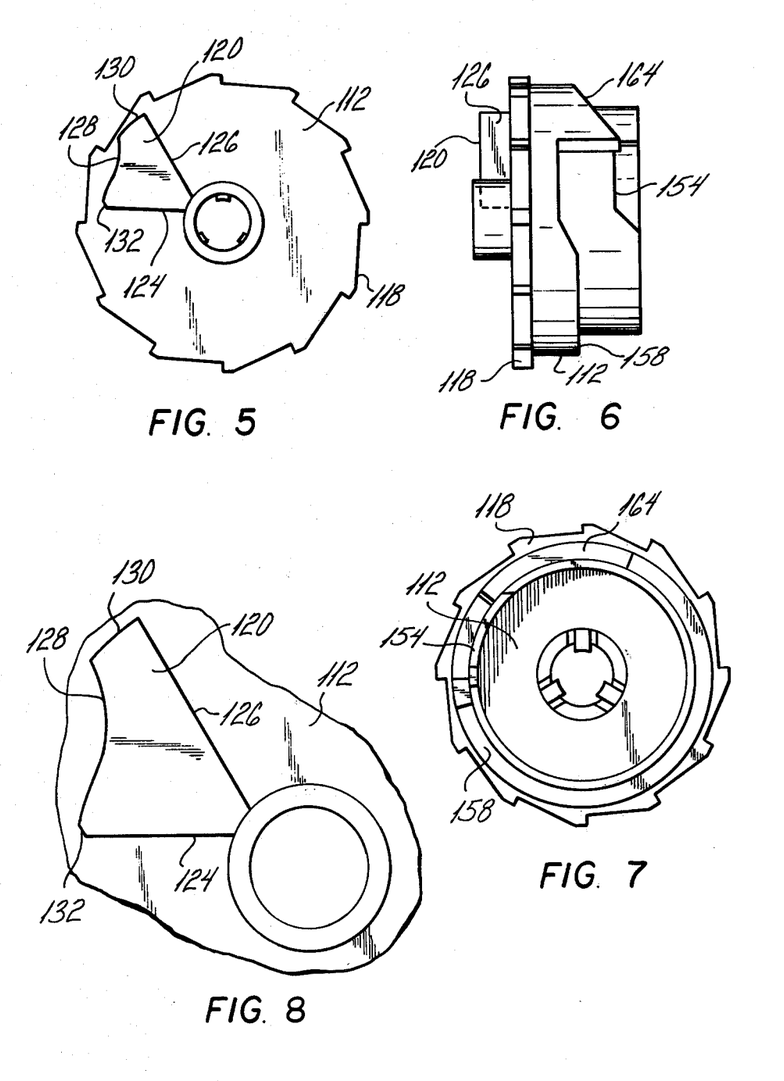
FIG. 5 is a bottom view of the rachet wheel, forming a portion of the windshield washer pump drive mechanism of the present invention.
FIG. 6 is a side elevational view of the rachet wheel shown in FIG. 5.
FIG. 7 is a top elevational view of the rachet wheel of FIG. 5.
FIG. 8 is an enlarged detailed view of the wedge shaped cam carried on the bottom of the rachet wheel of FIG. 5.

As best seen in FIG. 8, and as described below in detail, cam 120 is generally wedge-shaped and has radially extending side portions 124 and 126 and a lip engaging surface comprising a first part 128 and a second part 130. Between side portion 124 and the lip engaging surface is an intermediate surface 132, the purpose of which is described in detail below. When the rachet wheel is in its stop position, the lip engaging surface engages lip 122 on piston rod 48, so as to prevent further movement of the piston rod and, therefore, pumping action.

Rachet wheel 112 is adopted to be intermittently rotatably indexed in the clockwise direction, as seen in FIG. 2, by drive pawl 110 when the latter is drivingly connected therewith. To this end, rachet wheel 112 is provided with evenly spaced, uniformly shaped, teeth 118 and the pawl 110, which is continuously moved toward and from the rachet wheel 112 by the drive pin 94 of cam follower 90, when the wiper motor is energized, has an end portion 134 which extends generally tangentially of the rachet wheel 112 and which is provided with a tooth receiving window or slot 136. The end portion 136 of pawl 110 is biased towards engagement with the periphery of the rachet wheel by spring 104. End 134 is adopted to hook behind the adjacently located tooth 118 on rachet wheel 112 when pawl 110 is moved towards the rachet wheel, and to index the rachet wheel in a clockwise direction, as shown in FIG. 2.

Although the drive pawl 110 is continuously moved toward and from the rachet wheel 112 by the drive pin 94 of the cam follower, it is normally prevented from engaging and indexing the rachet wheel 112 by a control arm 138, which is suitably pivotally supported at one end portion 140 by armature frame 116 for movement both radially and axially of the rachet wheel 112.

Figures 17, 18, 19, 20:
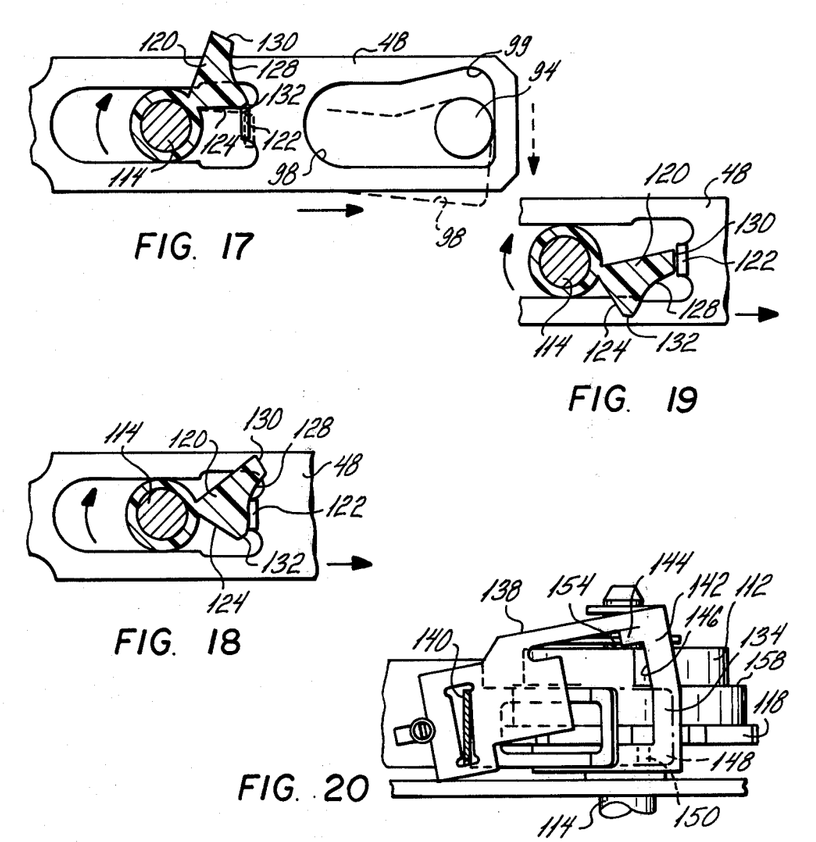
FIGS. 17, 18 and 19 are views of the wedge shaped cam and piston rod, showing same in different relative positions.
FIGS. 20 and 21, respectively, are views of the rachet wheel and pawl engaging mechanisms, showing different relative positions thereof.
Figure 21:
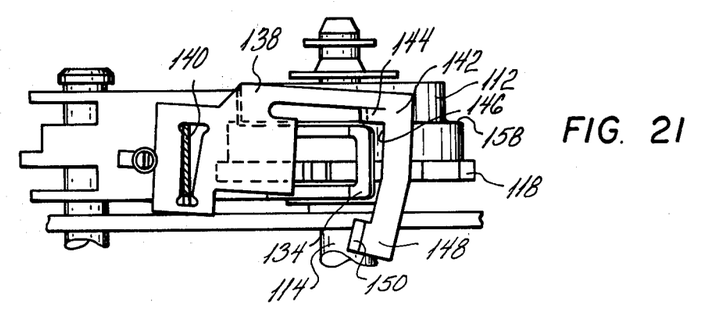

As is best shown in FIGS. 20 and 21, the arm 138 has a generally "J"-shaped free end 142, having a finger 144 extending transversely of the plane of arm 138 and generally radially of the rachet wheel 112. The "J"-shaped portion 142 defines an elongated slot 146, through which the end portion 134 of pawl 110 is adopted to pass. The short leg 148 of "J"-shaped portion 142 defines a ramp surface 150, which is adopted to be engaged by the end 134 of the drive pawl as the latter is moved toward and from the rachet wheel 112 to prevent the end of the pawl from hooking behind the adjacent tooth 118 on the rachet wheel 112.

Arm 138 is biased by a tension spring 152 toward a first or normal position in which the finger 144 engages the upper rim 154 of rachet wheel 112 (see FIG. 6) and extends radially inwardly thereof and in which the ramp surface 150 is disposed in the path of movement of the drive pawl 110. The spring 152 has one end connected to the end portion of arm 138 and its other end connected to the armature frame 106 by means of a finger 156 extending therefrom. Spring 152 functions to bias the arm 138 in a direction both radially inwardly of the rachet wheel 112 and axially downward towards the teeth 118 thereon, as viewed in FIG. 3. As best shown in FIG. 20, the ramp surface 150 serves to engage and move the end 134 of pawl 110 radially outwardly of the rachet wheel 112 in opposition to the biasing force of spring 152 and to prevent the end 134 from hooking behind the adjacent tooth 118 on the rachet wheel. To facilitate this movement, the end 134 of the drive pawl is bent in a direction away from the periphery of the rachet wheel, as is clearly shown in FIG. 2.

The arm 138 is movable from its first or normal position, shown in FIG. 20, to a second position, as shown in FIG. 21, in which it is situated such that it permits the end 134 of the pawl 110 to engage and hook behind the teeth 118 on rachet wheel 112 and to index the latter. When the arm 138 is in its second position, the finger 144 is in engagement with the outer periphery of the rachet wheel at rim 154 thereon and, in particular, is in engagement with the annular radially extending surface or shoulder 158 thereof, and the ramp surface 150 is located out of the path of movement of the drive pawl. The finger 144 serves to hold the arm 138 in a position which is radially spaced from the periphery of the rachet wheel, so as to enable the drive pawl to drivingly engage the rachet teeth 118.

The arm 138 is movable from its first position to its second position in response to momentary energization of an electromagnet 160, shown in FIG. 2. The electromagnet 160 is carried by armature frame 106 and functions when energized to draw the arm 138 radially away from the periphery of the rachet wall 112 to an intermediate position in which it is in engagement with the electromagnet. When the electromagnet is deenergized, spring 152 will pivot the arm 138 downwardly from its intermediate position towards the rachet wheel 112 and radially, inwardly against the upper portion of the rachet wheel, until finger 144 is in engagement with the annular surface 158 on the upper portion of the rachet wheel.

Operation of the washer unit is initiated when the wiper motor is energized by momentarily energizing the electromagnet 160. Energization of the electromagnet 160 causes arm 138 to be moved from its first or normal position, as shown in FIG. 20, to its intermediate position in which it is held against the electromagnet. When the coil of the electromagnet is de-energized, the spring 152 moves the arm 138 from its intermediate position to its second position, as shown in FIG. 21, in which the finger 144 holds the armature in a position which is radially spaced from the periphery of the rachet wheel 112 so as to enable the end of the pawl to engage and hook behind the teeth 118 of the rachet wheel.

As the pawl 110 is moved toward the rachet wheel 112 by the cam follower, the end thereof engages the adjacently located teeth 118 on the rachet wheel and is cammed radially outwardly of the rachet wheel in opposition to the biasing force of the spring 104. To facilitate this latter movement, the rachet teeth 118 are tapered along their leading edges and the end of the pawl is bent in a direction away from the outer periphery of the rachet wheel. The pawl 110 is cammed radially outwardly of the rachet wheel until the window 136 thereof is positioned over the adjacently located tooth 118 whereupon the spring 104 moves the end of the pawl radially inwardly relative to the rachet wheel to hook the end of the pawl behind the tooth. Reverse rotation of the rachet wheel is prevented by a pair of plastic, flexible backlash levers 162 carried by frame 30.

As the pawl is moved away from the rachet wheel 112, the end thereof engages the adjacent tooth and indexes the rachet wheel in a clockwise direction, seen in FIG. 2, an angular extent equal to circumferential distance of one rachet tooth. The number of rachet teeth provided, in the preferred embodiment, is twelve and, thus, the angular extent to which the rachet wheel is indexed during indexing movement is 30°.

As the rachet wheel 112 is indexed in the clockwise direction, as seen in FIG. 2, during the first indexing movement, the lip engaging surface part 130 on cam 120 is disengaged from lip 122 on piston rod 48. This allows the charged spring 62 to move the piston rod and, thus, piston 46 through its discharge stroke. The piston 46, when moved through its discharge stroke, supplies fluid under pressure to nozzles 60 from which the fluid is squirted against the windshield 12 in the arcuate path of movement of the wiper blades. When the piston 46 of the pump moves through its discharge stroke, the drive pin 94 of the cam follower engages the piston rod at the rear edge of slot 98 therein to effect a driving connection between the piston rod 48 and the cam follower. The pawl 110 is moved towards the rachet wheel 112 by the drive pin 94 during the discharge stroke of piston 46 and is moved away from the rachet wheel 112 to index same during the intake stroke of the piston 46.

The rachet wheel 112 is indexed 30° in the clockwise direction, seen in FIG. 2, by the pawl 110 during the intake strokes of each cycle of the operation of the pump. As the rachet wheel 112 is indexed, the finger 144 rides on the annular surface 158 on the upper portion of the rachet wheel. This operation continues through ten indexing movements.

On the eleventh indexing movement of the rachet wheel, the side portion 124 of cam 120 will move into a position adjacent the path of movement of lip 122 on piston rod 48. As is best seen in FIG. 17, as the piston 46 is moved through its intake stroke, towards the right as viewed in FIG. 17, the side of lip 122 will engage the side portion 124 of the cam, and normally interfere with the indexing movement of the rachet wheel 112. This arrangement between the lip 122 on piston rod 48 and the side portion 124 of cam 120 occurs during the latter portion of the eleventh indexing movement of the rachet wheel 112.

If, as in prior art mechanisms of this type, side portion 124 meets portion 128 of the lip engaging surface of cam 120 at approximately a right angle so as to form a sharp corner therebetween, the mechanism will jam at this point and further operation thereof will be prevented by the binding of the side of lip 122 with the corner between side surface 124 and part 128 of the lip engaging surface of the cam. In prior art mechanisms, this jamming problem is compensated for by providing a flexible tooth on the rachet wheel, such that the flexible tooth engages the pawl 110 at the point in the rotational position of the rachet wheel where the side of lip 122 engages the corner between side surface 124 and part 128 of the lip engaging surface of cam 120.

However, in the present invention, in order to avoid the necessity of the flexible tooth and the design and manufacturing complexities resulting therefrom, the piston rod 48 is designed to permit a degree of mechanical "yield", through the lateral movement thereof and the structure of cam 120 has been altered, in order to prevent jamming. The neck portion 45 of rod 48 is narrowed with respect to opening 43 in the pump housing and slot 98 in rod 48 has been provided with a laterally extending lobe shaped opening 99 to permit piston rod 48 to move laterally with respect to the normal path through which it reciprocates. Cam 120 is provided with an intermediate surface 132, preferably located at an obtuse angle with respect to side surface 124 of cam 120. The structure of cam 120 is illustrated in detail in FIG. 8. The presence of intermediate surface 132 at the corner between side surface 124 and part 128 permits the lip 122 to clear the side surface 124 of the cam as the piston rod 48 is moved laterally, such that the lip 122 may be located adjacent part 128 of the lip engaging surface of cam 120 as rachet wheel 112 completes its eleventh indexing.

As piston rod 48, and thus lip 122, moves away from the pump as the intake stroke is completed (toward the right as seen in FIG. 17) and rachet wheel 112 rotates in a clockwise direction (as seen in FIG. 17), the side of lip 122 moves first along side surface 124 towards the intermediate surface 132 thereon. The side surface 124, as the rachet wheel rotates, exerts a force on the side of lip 122 causing piston rod 48 to move laterally (downward as seen in phantom in FIG. 17) from its normal position, such that pin 94 is momentarily situated within laterally extending lobe shaped opening 99 in slot 98. This permits lip 122 to clear side surface 124, allowing further rotation of the rachet wheel such that lip 122 passes over intermediate surface 132 and onto lip engaging surface part 128. After lip 122 clears intermediate surface 132, cam 120 no longer exerts a sidewise directed force on lip 122 and piston rod 48 returns to its original lateral position, as shown in solid in FIG. 17. Thus, pin 94 no longer rests in the laterally extending lobe shaped opening 99 of slot 98. Further rotation of wheel 112 causes lip 122 to move along lip engaging surface part 128 of cam 120 (as shown in FIG. 18), which has a substantially concave curvature. As a result of the presence of intermediate surface 132 and the lateral movement of rod 48, jamming of lip 122 with cam 120 is eliminated.

After lip 122 on piston rod 48 clears intermediate surface 132 of cam 120, the biasing force of spring 104 on pawl 10 causes the remaining rachet wheel 112 to be rotated through the remaining portion of its indexing movement, such that part 128 of cam 120 is disposed in front of lip 122 on piston rod 48, as shown in FIG. 18. When this occurs, the driving connection between the piston rod 48 and the cam follower 90 is interrupted, since the piston 46 cannot be moved through its discharge stroke by spring 62.

The driving connection between the pawl 110 and the rachet wheel 112 is automatically interrupted on the next or twelfth indexing movement of rachet wheel 112. To this end, the annular 158 of the rachet wheel 112 is provided with a sharply rising cam surface 164 (see FIG. 6) extending from the annular surface 158. As rachet wheel 112 is rotatably indexed to its twelfth indexing movement, the finger 144 engages the cam surface 164 and is cammed upwardly, as viewed in FIG. 20, towards the rim 154 of the wheel in opposition to the biasing force of spring 152 until the finger 144 clears the cam surface 164, whereupon the spring 152 will snap or move the arm 138 to its first or normal position. When in this position, the ramp surface 150 will be disposed in the path of movement of the end 134 of the pawl 110, such that when the pawl is moved toward and from the rachet wheel 112, it engages the ramp surface 150 and is held away from rachet teeth 118 of the rachet wheel 112.

Also, during the last of twelfth indexing movement of the rachet wheel 112, the lip 122 on the piston rod 48 is cammed from part 128 to part 130 of the lip engaging surface of cam 120, as shown in FIG. 19. This further charges spring 62 and positions the slot 98 of piston rod 48, such that the pin 94, which moves within the slot 98 during the wiper operation, does not engage the piston rod 48 at the rearward end of the slot, so as to prevent any clicking noise.

As indicated previously, it is necessary that drive pin 86 be properly engaged within slot 88 on the boss 68 of the pin engaging portion of drive cam 64 in order for drive cam 64 to be rotated. Thus, during installation of the windshield washer pump drive mechanism to the wiper motor, is necessary that the drive cam 64 be positioned with respect to the drive pin 86 such that when the housing 30 is affixed to the motor unit, pin 86 is received within boss 68 of the pin engaging portion of cam 64. In mechanisms without the fast response feature, drive cam 64 is held firmly in one of four rotational positions by the urging of spring loaded cam follower 90 because cam follower roller 92 must be in one of the four recesses of the drive cam. However, the drive pin, if the wiper motor was turned off prior to placing the windshield wipers in the park position, which is often the case, can be in any position along its circular path. Because the parts are not easily aligned and because the installer cannot visually line up the drive pin and the boss 68 of the drive pin engaging portion of drive cam 64, housing 30 preventing him from viewing same, installation is difficult and time consuming.

However, in the present invention, installation is made simple as no alignment of the parts is required. The drive pin 86 will automatically be aligned with and received into the slot 88 in boss 68 of the drive pin engaging portion of drive cam 64 after the wiper motor is actuated.

Figures 9, 10, 11:
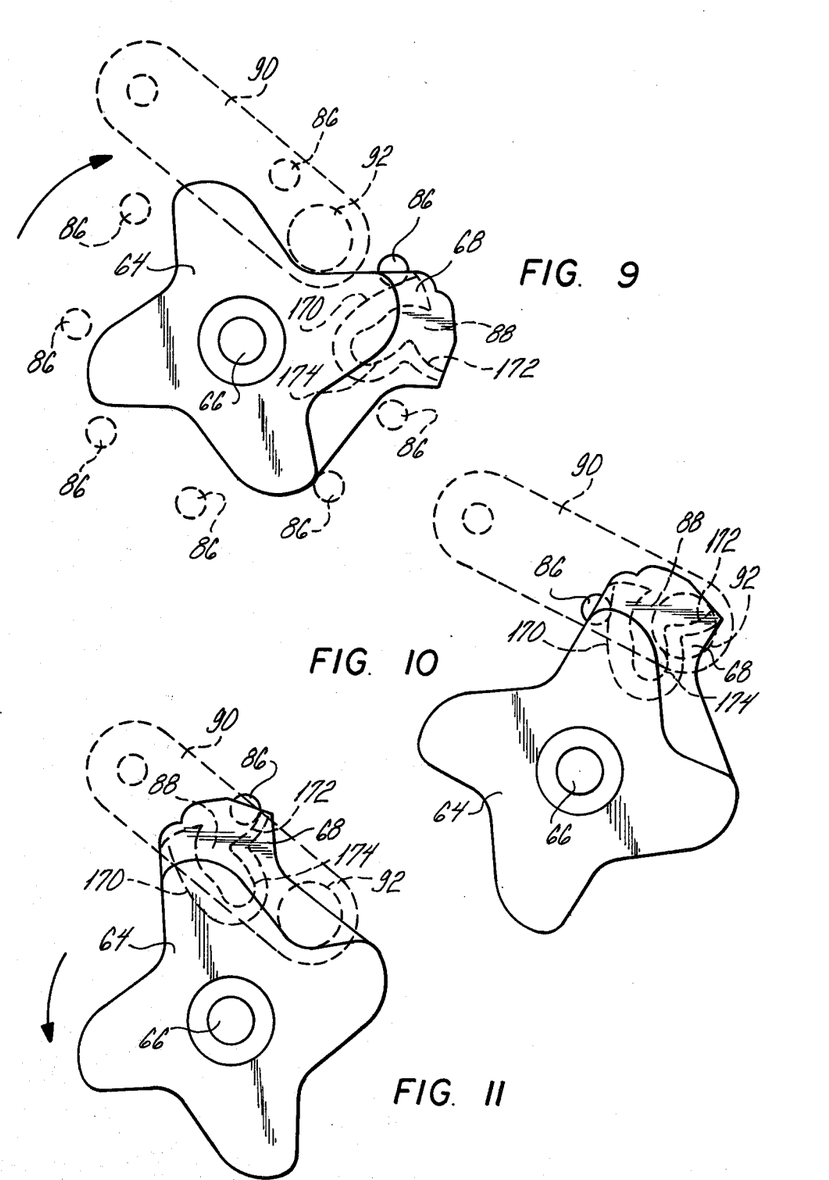
FIGS. 9 through 16, respectively, are views of the drive cam and drive pin of the windshield washer pump drive mechanism of the present invention, showing these parts in different relative positions.

The manner in which this result is obtained is best understood from a consideration of the sequential views FIGS. 9 through 16, which show the relative positions of the drive pin 86 and the drive pin engaging portion of drive cam 64. FIG. 9 shows that, during installation, the cam follower 90 is urged towards drive cam 64, such that the roller 92 is situated in one of the recesses along the periphery of the drive cam 64. If the car motor has been shut off before shutting off the windshield wiper mechanism, the drive pin 86 can be in any position along its circular path as denoted by the eight representations of the drive pin 86 in FIG. 9.

With the present invention, installation is performed simply by affixing the windshield washer pump drive mechanism to the wiper motor housing by screws or other conventional means. Alignment of the drive pin engaging portion of the drive cam with the drive pin 86 is unnecessary. The actuation of the wiper motor will cause the drive pin 86 to revolve around its circular path, without engaging the drive cam 64, until the drive pin 86 reaches a position adjacent boss 68 as shown in solid in FIG. 9. Once this position is attained, the side of drive pin 86 will abut the exterior edge 170 of the boss 68, which intersects the circular path of movement of pin 86 when the latter is in the running position. Further revolution of pin 86 will cause drive cam 64 to rotate, thus providing the pumping action.

When the wiper motor switch is deactuated, the drive pin 86 is moved to a prescribed point along its circular path (shown in FIG. 10) so as to move the wipers to their inboard position, and, thereafter, the pin moves in a generally radial path outwardly from that point to the park position (as shown in FIG. 11), as the windsheld wipers are moved to their park position. When the drive pin moves to the prescribed point along its circular path, cam follower roller 92 is situated on the side of one of the protrusions on the periphery of drive cam 64 and not in at the bottom of a recess therein, as shown in FIG. 10. As the drive pin 86 moves radially outwardly from the prescribed point on the circular path to its park position, the engagement between exterior surface 170 of boss 68 and drive pin 86 is terminated because exterior surface 170 does not extend outwardly radially of the circular path sufficiently to engage pin 86 when same is in the park position. When the engagement between the exterior edge 170 and drive pin 86 is terminated, the urging of the cam follower roller 92 against the periphery of the drive cam 64 causes the drive cam 64 to rotate a small distance (counterclockwise, as viewed in FIG. 11) until cam follower roller 92 rests within the nearest recess along the periphery of drive cam 64. This rotation of drive cam 64 will cause the open end of slot 88, generally radially extending along boss 68 of the pin engaging portion, to automatically align with the drive pin 86 in its park position. This is shown in FIG. 11.

The leading interior edge of slot 88, adjacent pin 86 when same is in the park position, has a first portion 172 and a second portion 174. Portion 174 of the leading interior edge of slot 88 intersects the circular path of movement of the drive pin when same is in the running position. Portion 172 of the leading interior edge of slot 88 extends radially outwardly of the portion 174 to engage pin 86 when same is in the park position.

Figures 12, 13, 14:
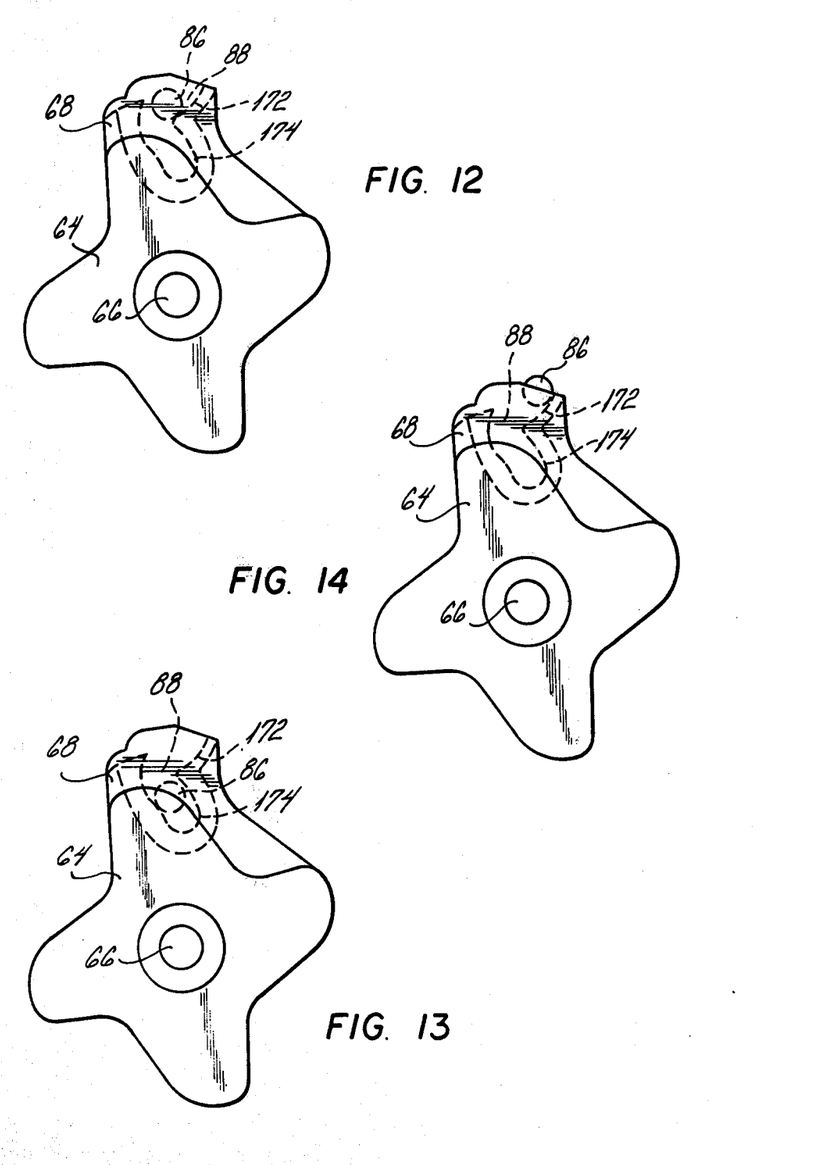

When the wiper motor is again actuated, pin 86 will move from its park position, as shown in FIG. 11, radially inwardly towards the circular path, as shown in FIG. 12, such that it rides along surface 172 of the leading interior edge of slot 88. Pin 86 continues to move inwardly until same is in the drive position, such that it abuts portion 174, as shown in FIG. 13. Pin 86 will thereafter move in its circular running path, continuously abutting portion 174 of the leading interior edge of slot 88, causing drive cam 64 to rotate to provide the necessary pumping action.

When the wiper motor switch is again deactuated, drive pin 86 will move to the prescribed point along its circular path, rotating cam 64 along with it, and once it is in the prescribed position along the circular path, will move along a path generally radially outwardly thereof. As the drive pin 86 moves radially outwardly to the park position, portion 174 of leading interior surface of slot 88 is disengaged and portion 172 of the leading interior surface of slot 88 is once again engaged, as shown in FIG. 14.

Figure 15:
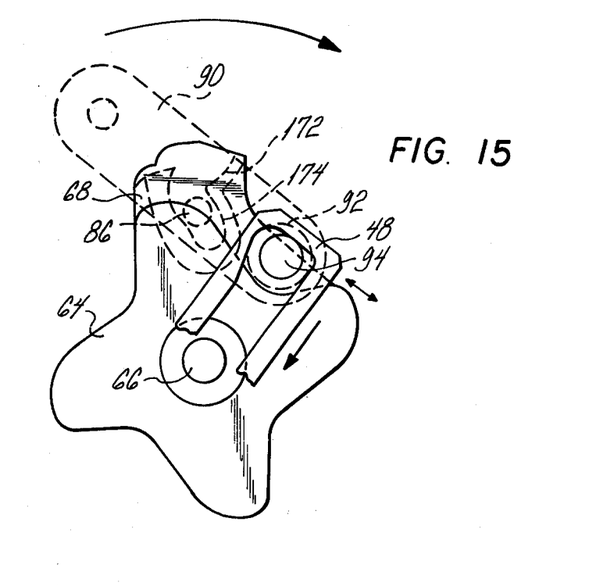

The next time the windshield wiper motor is actuated, pin 86 will move radially inwardly until it engages portion 174 of the leading interior edge of slot 88, as shown in FIG. 15, and will thereafter rotate cam 64 to provide the pumping action. When the wiper motor switch is deactuated, the pin will once again move to the park position, as shown in FIG. 16, where it engages portion 172 of the leading edge of slot 88.

Figure 16:
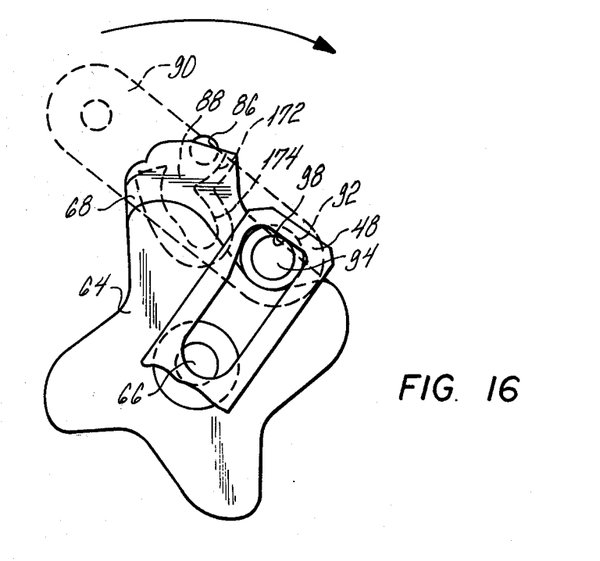

FIGS. 15 and 16 also illustrate the position of piston rod 48 relative to cam follower 90 as cam 64 is rotated. When pin 86 is in the running position, cam follower roller 92 will be situated in a recess along the contour of cam 64 four times for each revolution of cam 64, such that the piston rod 48 is driven through four strokes. As the last discharge stroke is completed, pin 92 is situated against the middle of the rear edge of slot 98, as illustrated in FIG. 15. In this position, piston rod 48 may be moved laterally such that pin 92 rests within laterally extending lobe shaped opening 99 in slot 98, as lip 122 is pushed sidewise by cam 120, due to the rotation of rachet wheel 112. After the lip 122 clears the corner of cam 120 (FIG. 17), cam 120 no longer exerts a lateral force on lip 122 and piston rod 48 returns to its normal position. When the pin 86 is in the park position, as shown in FIG. 16, piston rod 48 is always situated with pin 94 abutting the rear edge of slot 98. Thus, in the park position, piston rod 48 is always at the end of a discharge stroke.

It will now be readily appreciated that regardless of the relative position of drive cam 64 and drive pin 86 during installation, after the first revolution of drive pin 86 along its circular path, and the subsequent deactuation of the wiper motor to place the drive pin in the park position, the action of cam follower 90 on the surface of drive cam 64 will automatically cause slot 88 to align with the park position of the drive pin. Thereafter, the leading interior edge of slot 88 will engage drive pin 86, regardless of whether it is in its running or park position. Thus, the unique structure of the pin engaging portion of drive cam 64 eliminates the necessity for aligning the parts during installation, making installation a simple, quick operation.

The present invention is greatly improved in two major aspects over prior art windshield washer pump drive mechanisms. The first aspect relates to the fact that the necessity for the critical alignment of parts during installation has been eliminated due to the unique design of the pin engaging portion of the drive cam. The exterior edge of the pin engaging portion is designed to intersect the circular path of the drive pin in the running position. Thus, during the initial actuation of the wiper motor after installation, the exterior edge of the pin engaging portion will engage the pin and the movement of the pin will cause rotation of the drive cam. When the drive pin moves to the park position, the action of the cam follower along the periphery of the drive cam will cause the drive cam to rotate, such that the pin engaging portion aligns with the drive pin and the drive pin, in the park position, is received within the mouth of the generally radially extending slot formed in the pin engaging means. Unlike the exterior surface of the pin engaging means, the leading interior surface of the slot extends radially outwardly of the circular path a sufficient distance to engage the drive pin, even when the drive pin is in the park position. Subsequent actuation of the wiper motor causes the drive pin to move radially inwardly and outwardly of the circular running path. However, this inward and outward radial motion of the drive pin is entirely within the slot in the pin engaging portion. Thus, the pin engaging portion of the drive cam automatically aligns with and engages the drive pin in all subsequent operations of the wiper motor, thereby eliminating the necessity for aligning the parts during installation.

The second aspect of the invention relates to the structure of the cam carried by the lower portion of the rachet wheel and the design of the piston rod, which cooperate to permit the elimination of the flexible tooth on the rachet wheel and the design and manufacture complexities resulting therefrom. This result is accomplished by lateral movement of the piston rod to permit the lip to clear the side of the rachet wheel cam, and by providing an intermediate surface between the side surface and the lip engaging portion of the cam to facilitate movement of the lip from the side surface of the cam. The intermediate surface is positioned on the cam, such that as the reciprocating piston rod is moved laterally, the lip clears the side surface. In this manner, jamming of the mechanism is eliminated without the requirement of a flexible tooth on the periphery of the rachet wheel.

While only a single preferred embodiment of the present invention has been disclosed herein for purposes of illustration, it is obvious that many modifications and variations could be made thereto. It is intended to cover all of these variations and modifications which fall within the scope of the following claims:

We claim:

1. A windshield washer pump drive mechanism for use in conjunction with a windshield wiper drive motor of the type having a drive pin adapted to revolve in a circular path when the motor is actuated, and movable to a prescribed point along said circular path and then in a generally radial direction, outwardly thereof, to a park position as said motor is deactuated, said mechanism comprising a pump, a reciprocatable rod for driving said pump, movable cam means, means operably connected to said rod and said cam, to reciprocate said rod between intake and discharge positions, respectively, in accordance with the movement of said cam, and means for automatically causing engagement between said cam and said drive pin after installation of said mechanism adjacent said motor, said engaging means comprising: first means situated on said cam and adapted to engage said pin only during the movement of said pin along said circular path prior to the first movement of said pin to said park position after installation; second means situated on said cam and adapted to engage said pin at all times after said pin is disengaged from said first means by said first movement of said pin to the park position; and, means for positioning said cam to bring said second means into engagement with said pin subsequent to said first movement of said pin to said park position.

2. The mechanism of claim 1, wherein said engaging means comprises a boss having a generally radially extending slot.

3. The mechanism of claim 2, wherein said first means comprises the exterior edge of said boss.

4. The mechanism of claim 3, wherein said exterior edge of said boss intersects said circular path.

5. The mechanism of claim 3, wherein said exterior edge extends outwardly from said circular path a distance less than the radial distance from said circular path to said park position of said pin.

6. The mechanism of claim 4, wherein said exterior edge extends outwardly from said circular path a distance less than the radial distance from the path to said park position of said pin.

7. The mechanism of claim 2, wherein said second means comprises the leading interior edge of said slot.

8. The mechanism of claim 7, wherein said leading interior edge of said slot intersects said circular path.

9. The mechanism of claim 7, wherein said leading interior edge of said slot extends radially outwardly to engage said pin in said park position.

10. The mechanism of claim 8, wherein said leading interior edge of said slot extends radially outwardly to engage said pin in said park position.

11. The mechanism of claim 10, wherein said leading interior edge of said slot comprises a first portion intersecting said circular path and a second portion engaging said pin when said pin is in said park position.

12. The mechanism of claim 6, wherein said second means comprises the leading interior edge of said slot.

13. The mechanism of claim 12, wherein said leading interior edge of said slot intersects said circular path.

14. The mechanism of claim 13, wherein said leading interior edge of said slot extends radially outwardly to engage said pin in said park position.

15. The mechanism of claim 14, wherein said leading interior edge of said slot comprises a first portion intersecting said circular path and a second portion positioned to engage said pin when said pin is in said park position.

16. The mechanism of claim 1, wherein said cam positioning means comprises a cam follower adapted to exert a force on the periphery of said cam tending to cause said cam to rotate until said cam follower rests in a recess along said periphery.

17. The mechanism of claim 16, wherein said engaging means comprises a boss having a generally radially extending slot.

18. The mechanism of claim 17, wherein said first means comprises the exterior edge of said boss.

19. The mechanism of claim 18, wherein said exterior edge of said boss intersects said circular path.

20. The mechanism of claim 19, wherein said exterior edge extends outwardly from said circular path a distance less than the radial distance to said park position of said pin.

21. The mechanism of claim 20, wherein said second means comprises the leading interior edge of said slot.

22. The mechanism of claim 21, wherein said leading interior edge of said slot intersects said circular path.

23. The mechanism of claim 22, wherein said leading interior edge of said slot extends radially outwardly to said park position.

24. The mechanism of claim 23, wherein said leading interior edge of said slot comprises a first portion intersecting said circular path and a second portion positioned to engage said pin when said pin is in said park position.

25. A windshield washer pump drive mechanism for use in conjunction with a windshield wiper drive motor having movable output drive means, said mechanism comprising a pump, a pump housing, a reciprocatable rod extending through an opening in said housing and being operably connected to actuate said pump as said rod is reciprocated, means normally operably connecting said rod with said output drive means for reciprocating said rod in a given direction in accordance with the movement of said output drive means, and means for preventing reciprocation of said rod after a given number of pump actuations, said reciprocation preventing means comprising: a rachet wheel having a plurality of evenly spaced, uniformly shaped, teeth on the periphery thereof; a pawl; means operably connected to said output drive means for moving said pawl to advance said wheel in accordance with the movement of said output drive means; and means, located on said wheel, for engaging said rod to prevent movement thereof when said wheel is advanced to a given position; said mechanism further comprising means for permitting movement of said rod in a direction other than said given direction to prevent jamming of said rod engaging means with said rod.

26. The mechanism of claim 25, wherein said rod has a protruding lip thereon and wherein said rod engaging means comprises a cam with a side surface and a lip engaging surface.

27. The mechanism of claim 26, further comprising an intermediate surface situated between said side surface and said lip engaging surface.

28. The mechanism of claim 27, wherein said intermediate surface forms an obtuse angle with said side surface.

29. The mechanism of claim 25, further comprising a slot in said rod, elongated in said given direction and wherein said means for moving said pawl extends from said output drive means through said slot to said pawl.

30. The mechanism of claim 29, wherein said movement permitting means comprises a laterally extending lobe shaped opening forming a part of said slot.

31. The mechanism of claim 30, wherein said movement permitting means further comprises means for providing lateral clearance between said rod and pump housing opening.

32. The mechanism of claim 25, wherein said other direction is substantially perpendicular to said first direction.

33. The mechanism of claim 27, further comprising a slot in said rod, elongated in said given direction and wherein said means for moving said pawl extends from said output drive means through said slot to said pawl.

34. The mechanism of claim 33, wherein said movement permitting means comprises a laterally extending lobe shaped opening forming a part of said slot.

35. The mechanism of claim 34, wherein said movement permitting means further comprises means for providing lateral clearance between said rod and pump housing opening.

36. The mechanism of claim 35, wherein said other direction is substantially perpendicular to said first direction.

* * * * *